(12) United States Patent  (10) Patent No.: US 7,797,316 B2
Henzinger  (45) Date of Patent: Sep. 14, 2010

(54) SYSTEMS AND METHODS FOR DETERMINING DOCUMENT FRESHNESS

(75) Inventor: Monika Henzinger, Lausanne (CH)

(73) Assignee: Google Inc., Mountain View, CA (US)

( * ) Notice: Subject to any disclaimer, the term of this patent is extended or adjusted under 35 U.S.C. 154(b) by 1003 days.

(21) Appl. No.: 10/879,503

(22) Filed: Jun. 30, 2004

(65) Prior Publication Data

US 2005/0144193 A1  Jun. 30, 2005

Related U.S. Application Data

(63) Continuation-in-part of application No. 10/748,664, filed on Dec. 31, 2003, now Pat. No. 7,346,839.

(60) Provisional application No. 60/507,617, filed on Sep. 30, 2003.

(51) Int. Cl.
*G06F 17/30* (2006.01)

(52) U.S. Cl. .................. 707/728; 707/729; 707/730; 707/731

(58) Field of Classification Search .............. 707/1–7, 707/104.1

See application file for complete search history.

(56) References Cited

U.S. PATENT DOCUMENTS

| | | | | |
|---|---|---|---|---|
| 6,163,778 | A * | 12/2000 | Fogg et al. ............... | 707/10 |
| 6,285,999 | B1 | 9/2001 | Page | |
| 6,421,675 | B1 | 7/2002 | Ryan et al. .............. | 707/100 |
| 7,058,628 | B1 * | 6/2006 | Page ...................... | 707/5 |
| 7,080,073 | B1 * | 7/2006 | Jiang et al. .............. | 707/7 |
| 7,093,012 | B2 | 8/2006 | Olstad et al. ............ | 709/224 |
| 7,146,409 | B1 * | 12/2006 | Bushee et al. ........... | 709/219 |
| 2002/0073065 | A1 * | 6/2002 | Inaba et al. ............. | 707/1 |
| 2002/0078045 | A1 | 6/2002 | Dutta | |
| 2002/0123988 | A1 | 9/2002 | Dean et al. ............. | 707/3 |
| 2002/0198875 | A1 * | 12/2002 | Masters ................... | 707/4 |
| 2003/0050909 | A1 | 3/2003 | Preda et al. | |
| 2003/0105744 | A1 | 6/2003 | McKeeth | |
| 2003/0135490 | A1 | 7/2003 | Barrett et al. | |
| 2003/0158749 | A1 | 8/2003 | Olchanski et al. | |
| 2004/0059997 | A1 * | 3/2004 | Allen et al. ............. | 715/501.1 |

(Continued)

FOREIGN PATENT DOCUMENTS

EP  1 107 128 A1  6/2001

OTHER PUBLICATIONS

Co-pending U.S. Appl. No. 10/748,664, filed Dec. 31, 2003 entitled "Information Retrieval Based on Historical Data," Anurag Acharya et al.; 53 page specification, 4 sheets of drawings.

(Continued)

*Primary Examiner*—Don Wong
*Assistant Examiner*—Hanh B Thai
(74) *Attorney, Agent, or Firm*—Harrity & Harrity, LLP

(57) ABSTRACT

A system determines a freshness of a first document. The system determines whether a freshness attribute is associated with the first document. The system identifies, based on the determination, a set of second documents that each contain a link to the first document. The system assigns a freshness score to the first document based on a freshness attribute associated with each document of the set of second documents or the freshness attribute associated with the first document.

39 Claims, 5 Drawing Sheets

U.S. PATENT DOCUMENTS

| | | | |
|---|---|---|---|
| 2004/0098405 A1* | 5/2004 | Zrubek et al. | 707/103 R |
| 2004/0243557 A1* | 12/2004 | Broder et al. | 707/3 |
| 2005/0144193 A1 | 6/2005 | Henzinger | |
| 2006/0036588 A1* | 2/2006 | Frank et al. | 707/3 |
| 2007/0094254 A1 | 4/2007 | Cutts et al. | |
| 2007/0094255 A1 | 4/2007 | Acharya et al. | |

OTHER PUBLICATIONS

Junyan Ding et al.; "Computing Geographical Scopes of Web Resources"; Proceedings of the 26$^{th}$ VLDB Conference, Cairo Egypt, 2000; 12 pages.

Monika Henzinger; "Web Information Retrieval—an Algorithmic Perspective"; Lecture Notes in Computer Science; vol. 1879; 2000; pp. 1-8.

PCT International Search Report for PCT/US2004/029982; dated Nov. 19, 2004; 4 pages.

Co-pending U.S. Appl. No. 11/536,901, entitled "Personalized Search Result Ranking", by Oren Zamir et al., filed on Sep. 29, 2006; 36 pages.

Office Action from U.S. Appl. No. 10/748,664, dated Dec. 27, 2006; 10 pages.

Office Action from U.S. Appl. No. 10/748,664, dated Jun. 14, 2007; 8 pages.

Office Action for U.S. Appl. No. 11/561,625, dated Nov. 25, 2008, 19 pages.

Office Action for U.S. Appl. No. 11/565,004, dated Mar. 5, 2009, 30 pages.

Office Action from U.S. Appl. No. 11/565,004, dated Sep. 2, 2009, 33 pages.

Office Action from U.S. Appl. No. 11/565,004, dated Aug. 19, 2008; 25 pages.

* cited by examiner

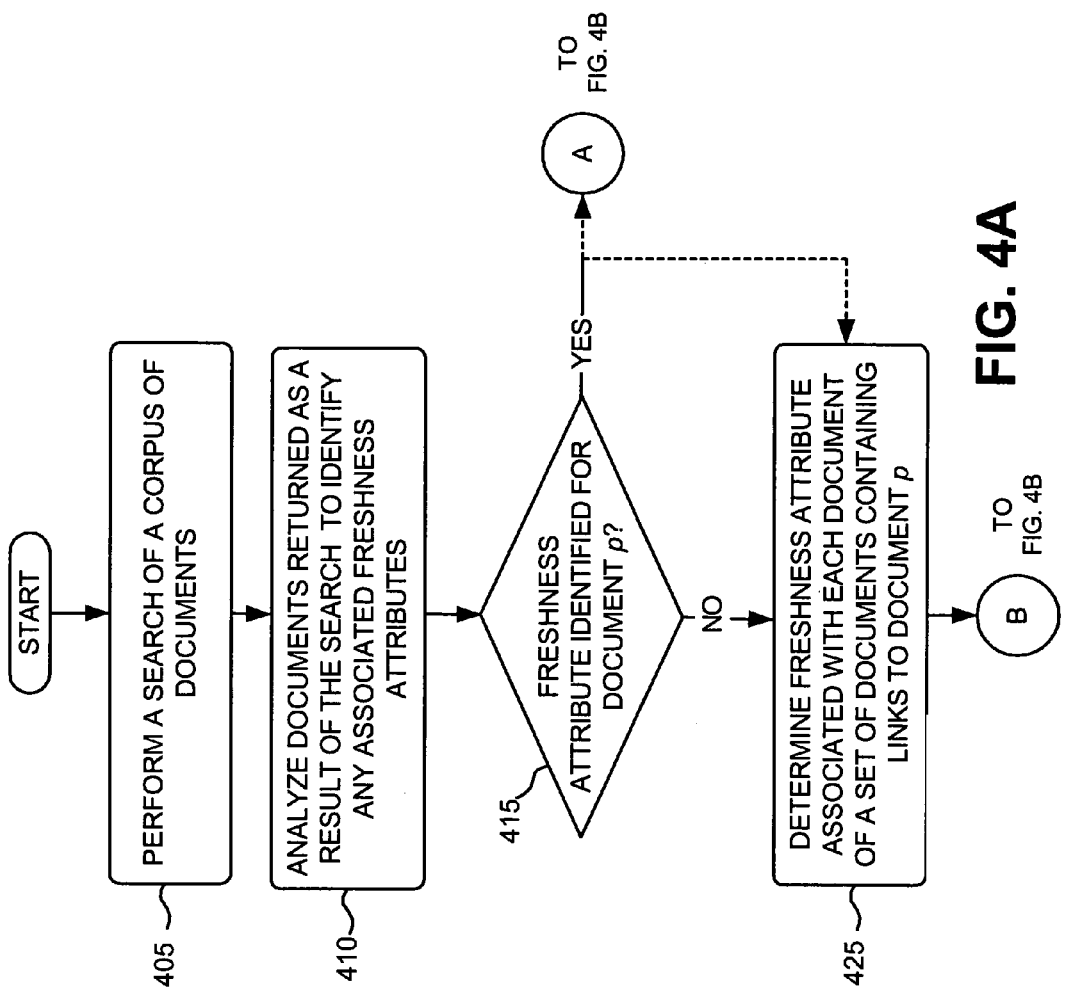

SYSTEMS AND METHODS FOR DETERMINING DOCUMENT FRESHNESS

RELATED APPLICATION

The present application is a continuation-in-part of U.S. application Ser. No. 10/748,664, entitled "Information Retrieval Based on Historical Data" and filed Dec. 31, 2003 now U.S. Pat. No. 7,346,839, which claims priority under 35 U.S.C. §119 based on U.S. Provisional Application No. 60/507,617, filed Sep. 30, 2003, the disclosure of which is incorporated by reference herein in its entirety.

BACKGROUND

1. Field of the Invention

Systems and methods consistent with the principles of the invention relate generally to information searching and, more particularly, to determining the freshness of retrieved documents and possibly using this freshness to score the retrieved documents.

2. Description of Related Art

Existing information searching systems use search queries to search through aggregated data to retrieve specific information that corresponds to the received search queries. Such information searching systems may search information stored locally, or in distributed locations. The World Wide Web ("web") is one example of information stored in distributed locations. The web contains a vast amount of information, but locating a desired portion of that information can be challenging. This problem is compounded because the amount of information on the web and the number of new users inexperienced at web searching are growing rapidly.

Search engines attempt to return hyperlinks to web documents in which a user is interested. Generally, search engines base their determination of the user's interest on search terms (called a search query) entered by the user. The goal of the search engine is to provide links to high quality, relevant results to the user based on the search query. Typically, the search engine accomplishes this by matching the terms in the search query to a corpus of pre-stored web documents. Web documents that contain the user's search terms are "hits" and are returned to the user.

Frequently, web documents that are returned as "hits" to the user include out-of-date documents. If the freshness of web documents were reliably known, then the known freshness could be used in the ranking of the search results to avoid returning out-of-date web documents in the top results. Currently, however, a reliable freshness attribute for web documents does not exist. HTTP supports a "last-modified-since" attribute that indicates the day a last modification was made to a corresponding web document. This attribute, however, is optional in HTTP and is not used by all web documents. Additionally, the data indicated in the HTTP "last-modified-since" attribute may not be correct.

SUMMARY OF THE INVENTION

According to one aspect consistent with the principles of the invention, a method of determining the freshness of a first document is provided. The method may include identifying a set of second documents that each contains a link to the first document and determining a freshness attribute associated with each document of the set of second documents. The method may further include assigning a freshness score to the first document based on the freshness attribute associated with each document of the set of second documents.

According to another aspect, a method of determining the freshness of a first document is provided. The method may include determining whether a freshness attribute is associated with the first document and identifying, based on the determination, a set of second documents that each contain a link to the first document. The method may further include assigning a freshness score to the first document based on a freshness attribute associated with each document of the set of second documents or the freshness attribute associated with the first document.

According to a further aspect, a method of assigning a freshness score to a first document is provided. The method may include identifying a set of second documents that each contains a link to the first document and determining a freshness associated with each document of the set of second documents. The method may also include assigning a first freshness score to the first document if more documents of the set of second documents correspond to documents that are not fresh. The method may further include assigning a second freshness score to the first document if more documents of the set of second documents correspond to documents that are fresh, where the first freshness score is different than the second freshness score.

According to yet another aspect, a method of determining the freshness of a first document is provided. The method may include identifying a set of second documents that each contains a link to the first document and determining times at which each of the links to the first document existed. The method may also include assigning a freshness score to the first document based on the determined times.

BRIEF DESCRIPTION OF THE DRAWINGS

The accompanying drawings, which are incorporated in and constitute a part of this specification, illustrate an embodiment of the invention and, together with the description, explain the invention. In the drawings.

FIGS. 4A and 4B are flowcharts of exemplary processing for determining the freshness of one or more documents according to an implementation consistent with the principles of the invention.

DETAILED DESCRIPTION

The following detailed description of the invention refers to the accompanying drawings. The same reference numbers in different drawings may identify the same or similar elements. Also, the following detailed description does not limit the invention.

A "document," as the term is used herein, is to be broadly interpreted to include any machine-readable and machine-storable work product. A document may include an e-mail, a web site, a file, a combination of files, one or more files with embedded links to other files, a news group posting, a blog, a web advertisement, etc. In the context of the Internet, a common document is a web page. Web pages often include textual information and may include embedded information (such as meta information, images, hyperlinks, etc.) and/or embedded instructions (such as Javascript, etc.). A "link" as the term is used here, is to be broadly interpreted to include any reference to or from a document.

Exemplary Overview

Figure 1:
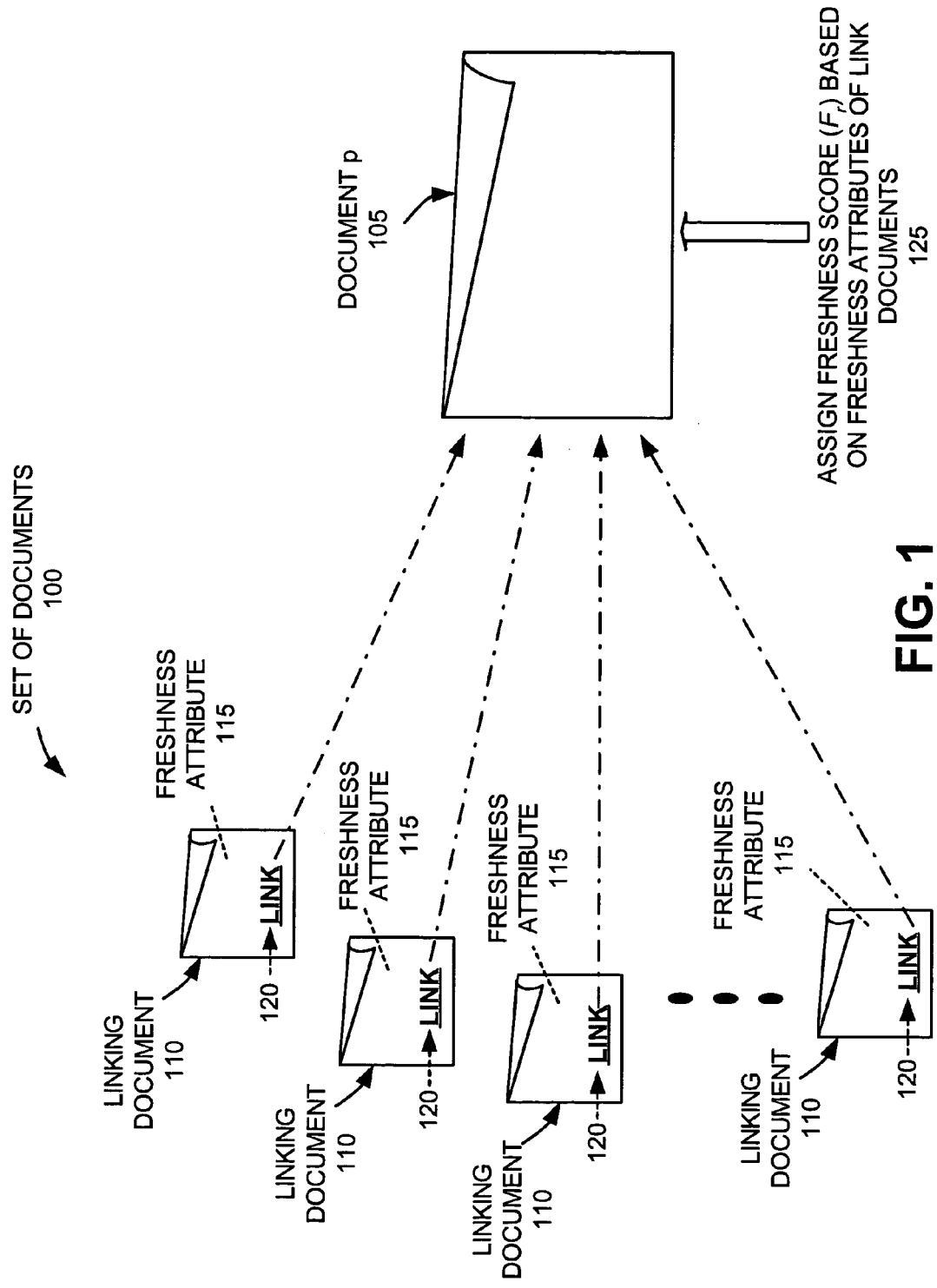
FIG. 1 is a diagram of an overview of an exemplary aspect of the invention.

FIG. 1 illustrates an overview of determining the freshness of a document according to an exemplary aspect of the invention. As shown in FIG. 1, a freshness score of a document p 105 may be based on freshness attributes 115 associated with each linking document 110 of a set of documents 100 that each have a link 120 pointing to document p 105. Set of documents 100 may include at least a portion of documents from a group of documents that each include at least one link 120 to document p 105. Each linking document 110 may have associated with it a freshness attribute 115 that provides some indication of when the respective linking document 110 was last modified, or updated. In some implementations consistent with principles of the invention, the freshness attribute may include an HTTP "last-modified-since" attribute. Other freshness attributes, however, may be used. Each linking document 110 may further include a link 120 that points to document p 105. Each link 120 may include, for example, a hypertext link. Each link 120 may exist during a time period and may, thus, have associated with it a creation time and a removal time.

A freshness score ($F_r$), that, in some implementations, may be used in ranking document p 105 when document p 105 is returned at a result of an executed document search, may be assigned to document p 105 based on the freshness attributes 115 associated with each linking document 110 of the set of documents 100, and/or based on times at which each link 120, pointing to document p 105, existed.

Exemplary Network Configuration

Figure 2:
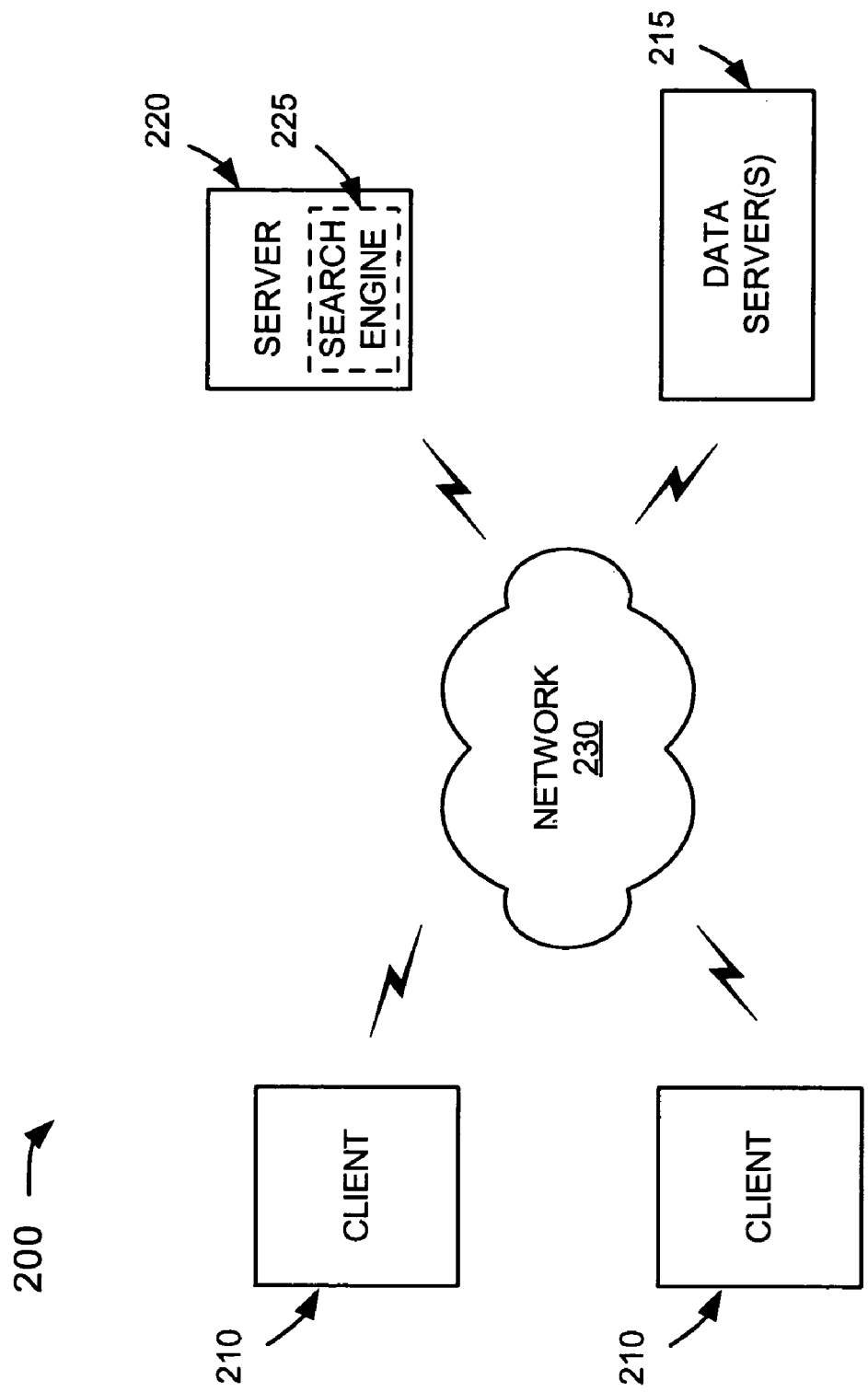
FIG. 2 is a diagram of an exemplary network in which systems and methods consistent with the principles of the invention may be implemented.

FIG. 2 is an exemplary diagram of a network 200 in which systems and methods consistent with the principles of the invention may be implemented. Network 200 may include multiple clients 210 connected to multiple servers 220 and 215 via a network 230. Network 230 may include a local area network (LAN), a wide area network (WAN), a telephone network, such as the Public Switched Telephone Network (PSTN), an intranet, the Internet, a memory device, another type of network, or a combination of networks. Two clients 210 and two servers 220 and 215 have been illustrated as connected to network 230 for simplicity. In practice, there may be more or fewer clients and servers. Also, in some instances, a client may perform the functions of a server and a server may perform the functions of a client.

Clients 210 may include client entities. An entity may be defined as a device, such as a wireless telephone, a personal computer, a personal digital assistant (PDA), a laptop, or another type of computation or communication device, a thread or process running on one of these devices, and/or an object executable by one of these devices. Servers 220 and 215 may include server entities that gather, process, search, and/or maintain documents in a manner consistent with the principles of the invention. Clients 210 and servers 220 and 215 may connect to network 230 via wired, wireless, and/or optical connections.

In an implementation consistent with the principles of the invention, server 220 may include a search engine 225 usable by users at clients 210. Server 220 may implement a data aggregation service by crawling a corpus of documents (e.g., web pages) hosted on data server(s) 215 and store information associated with these documents in a repository of crawled documents. The data aggregation service may be implemented in other ways, such as by agreement with the operator(s) of data server(s) 215 to distribute their hosted documents via the data aggregation service. Search engine 225 may execute a search, received from a user, on the corpus of documents hosted on data server(s) 215. Server 220 may assign freshness scores to documents retrieved as a result of the executed search based on freshness attributes associated with each linking document of a set of documents that includes a link to the documents retrieved as a result of the executed search.

Server(s) 215 may store or maintain documents that may be crawled by server 220. Such documents may include data related to published news stories, products, images, user groups, geographic areas, or any other type of data. For example, server(s) 215 may store or maintain news stories from any type of news source, such as, for example, the Washington Post, the New York Times, Time magazine, or Newsweek. As another example, server(s) 215 may store or maintain data related to specific product data, such as product data provided by one or more product manufacturers. As yet another example, server(s) 215 may store or maintain data related to other types of web documents, such as pages of web sites.

While servers 220 and 215 are shown as separate entities, it may be possible for one or more of servers 220 and 215 to perform one or more of the functions of another one or more of servers 220 and 215. For example, it may be possible that two or more of servers 220 and 215 are implemented as a single server. It may also be possible for a single one of servers 220 or 215 to be implemented as two or more separate (and possibly distributed) devices.

Exemplary Client/Server Architecture

Figure 3:
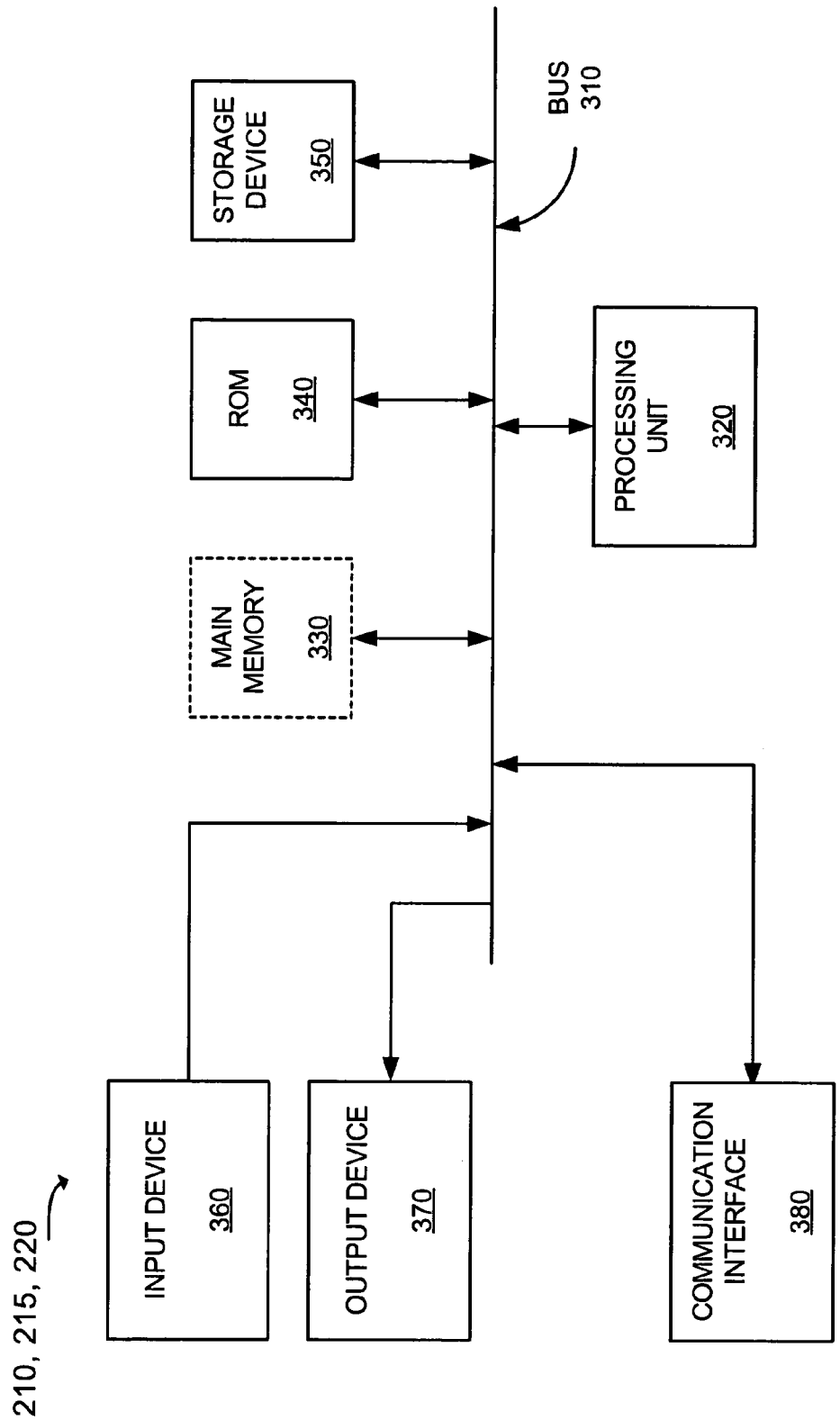
FIG. 3 is an exemplary diagram of a client and/or server of FIG. 2 in an implementation consistent with the principles of the invention.

FIG. 3 is an exemplary diagram of a client or server entity (hereinafter called "client/server entity"), which may correspond to one or more of clients 210 and servers 220 and 215, according to an implementation consistent with the principles of the invention. The client/server entity may include a bus 310, a processing unit 320, an optional main memory 330, a read only memory (ROM) 340, a storage device 350, an input device 360, an output device 370, and a communication interface 380. Bus 310 may include a path that permits communication among the components of the client/server entity.

Processing unit 320 may include any type of software, firmware or hardware implemented processing device, such as, a microprocessor, a field programmable gate array (FPGA), combinational logic, etc. Main memory 330 may include a random access memory (RAM) or another type of dynamic storage device that stores information and instructions for execution by processing unit 320, if processing unit 320 includes a microprocessor. ROM 340 may include a conventional ROM device or another type of static storage device that stores static information and/or instructions for use by processing unit 320. Storage device 350 may include a magnetic and/or optical recording medium and its corresponding drive.

Input device 360 may include a conventional mechanism that permits an operator to input information to the client/server entity, such as a keyboard, a mouse, a pen, voice recognition and/or biometric mechanisms, etc. Output device 370 may include a conventional mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 230.

As will be described in detail below, the client/server entity, consistent with the principles of the invention, may perform certain searching-related operations. The client/server entity may, in some implementations, perform these operations in response to processing unit 320 executing software instructions contained in a computer-readable medium, such as memory 330. A computer-readable medium may be defined as one or more physical or logical memory devices and/or carrier waves.

The software instructions may be read into memory 330 from another computer-readable medium, such as data storage device 350, or from another device via communication interface 380. The software instructions contained in memory 330 may cause processing unit 320 to perform processes that will be described later. Alternatively, hardwired circuitry may be used in place of, or in combination with, software instructions to implement processes consistent with the principles of the invention. Thus, implementations consistent with principles of the invention are not limited to any specific combination of hardware circuitry and software.

Exemplary Processing

Figure 4B:
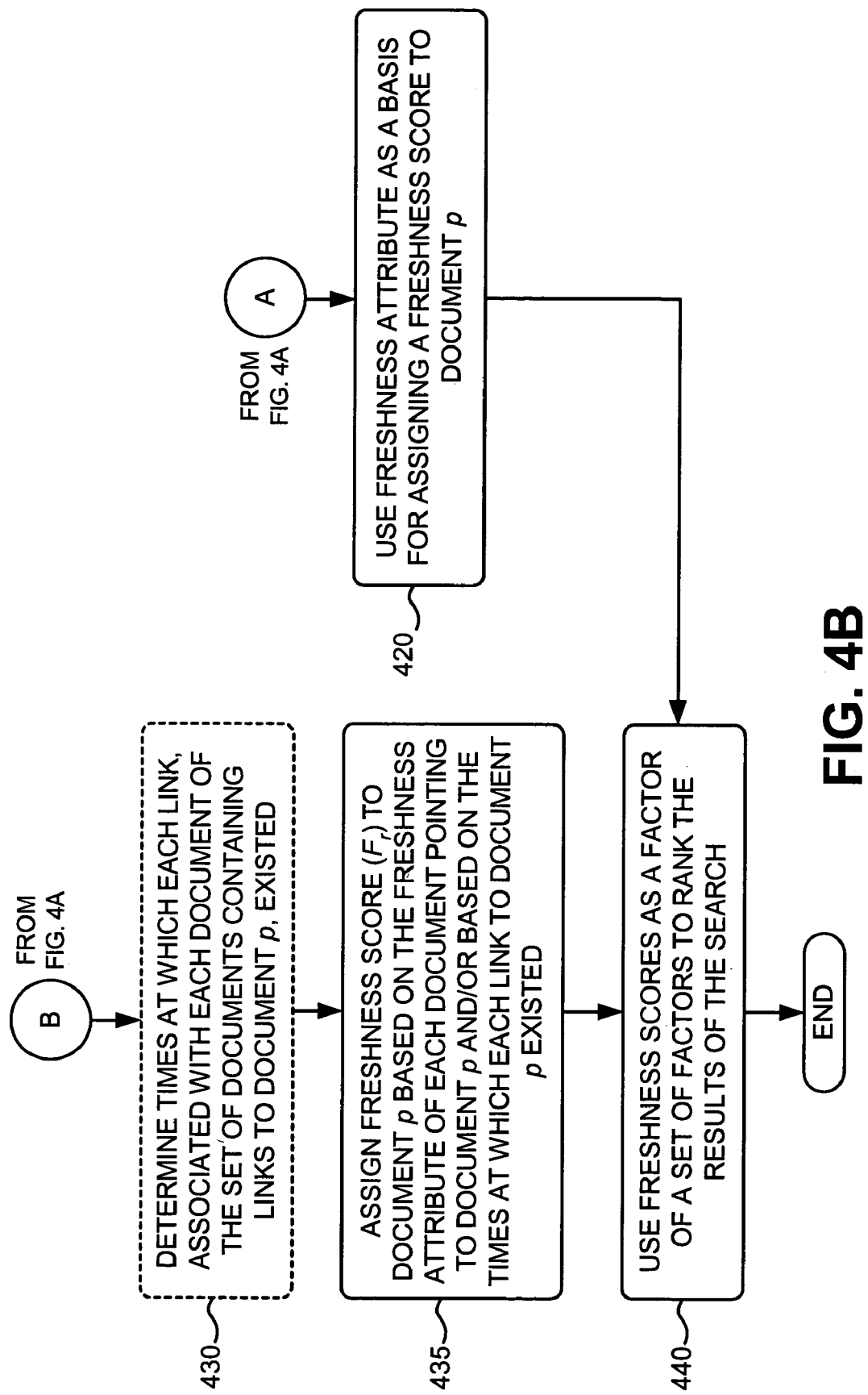

FIGS. 4A and 4B are flowcharts of exemplary processing for determining the freshness of one or more documents according to an implementation consistent with the principles of the invention. As one skilled in the art will appreciate, the processing exemplified by FIGS. 4A and 4B can be implemented in software and stored on a computer-readable memory, such as main memory 330, ROM 340 or storage device 350 of server 220. In other implementations, the processing exemplified by FIGS. 4A and 4B can be implemented in hardwired circuitry, such as combinational logic, within processing unit 320 of server 220.

Processing may begin with performance of a search through a corpus of documents (act 405). Search engine 225 of server 220 may use one or more search queries to perform the search. The documents returned as a result of the search may be analyzed to identify any associated freshness attributes (act 410). In one implementation, search engine 225 may identify a HTTP "last-modified-since" attribute as a freshness attribute for each document. For each document p returned as a result of the search, it may be determined whether an associated freshness attribute (e.g., a HTTP "last-modified-since" attribute) has been identified (act 415). If document p does have a freshness attribute associated with it, then the freshness attribute may be used as a basis for assigning a freshness score to document p (act 420)(FIG. 4B). In some implementations, for example, the freshness attribute may be used directly as a freshness score for document p.

If document p does not have a freshness attribute associated with it, or, optionally, even if document p does have a freshness attribute associated with it, then a freshness attribute associated with each document (e.g., linking document 110) of a set of documents that each currently contains, or previously contained, links to document p may be determined (act 425)(FIG. 4A). The set of documents that currently contain, or previously contained, links to document p may be selected randomly, or selected based on any appropriate criteria, from a group of documents containing a link to document p. A certain portion of the documents of the set of documents containing links to document p may include out-of-date documents (i.e., "not fresh"), while another portion of the documents of the set of documents containing links to document p may include "fresh" documents (i.e., documents that have been updated or modified within a configurable period of time relative to a current time). Optionally, times at which each link (i.e., link 120), associated with each document of the set of documents containing links to document p, existed may be determined (act 430)(FIG. 4B). A certain portion of the documents of the set of documents may have had a link to document p during a time period T, where T can be any specified length of time (e.g., the past two years). For each link to document p, the creation time and removal time of the link can be determined.

A freshness score ($F_r$) may be assigned to document p based on the freshness attribute of each linking document 110 pointing to document p and/or based on the times at which each link, pointing to document p, existed (act 435). For example, if the number of "not fresh" documents of the set of documents containing links to document p is greater than the number of "fresh" documents of the set of documents containing links to document p (i.e., as determined by freshness attribute(s) associated with each document of the set of documents), then document p can be considered "not fresh," and a corresponding "low" freshness score $F_r$ may be assigned to document p. As an illustrative example, if each document of a set of 100 documents containing a link to document p each has a freshness attribute, such as, for example, a HTTP "last-modified-since" attribute, that indicates that 80 of the documents have been not been recently modified or updated (i.e., modified or updated within a configurable period of time relative to a current time) and, thus, are not fresh, then a "low" freshness score $F_r$ can be assigned to document p.

As another example, if the number of "fresh" documents of the set of documents containing links to document p is greater than the number of "not fresh" documents of the set of documents containing links to document p (i.e., as determined by freshness attribute(s) associated with each document of the set of documents), then documents can be considered "fresh," and a corresponding "high" freshness score $F_r$ may be assigned to document p. To illustrate, if each document of set of 100 documents containing a link to document p has a freshness attribute, such as, for example, a HTTP "last-modified-since" attribute, that indicates that 70 of the documents have been recently modified or updated and, thus, are fresh, then a "high" freshness score $F_r$ can be assigned to document p.

As a further example, if the number of links that currently point to document p is smaller than the number of links that pointed to document p at some time t in the past (e.g., one year ago), then document p can be considered to be "not fresh" and a corresponding "low" freshness score $F_r$ may be assigned to document p. As another example, if the number of links that pointed to document p at some time t in the past is smaller than the number of links that currently point to document p, then document p can be considered "fresh" and a corresponding "high" freshness score $F_r$ may be assigned to document p.

As yet another example, if a ratio of a number of recent, or "new," links to document p to a number of not recent, or "old," links to document p is larger than a threshold value $T_h$, then document p can be considered "not fresh" and a corresponding "low" freshness score $F_r$ may be assigned to document p. If the ratio of the number of "new" links to document p to the number of "old" links to document p is smaller than a threshold value $T_h$, then document p can be considered "fresh" and a corresponding "high" freshness score $F_r$ may be assigned to document p. Acts 415-435 may be performed for each document p returned as a result of the performed search to assign a freshness score $F_r$ to each document p.

The freshness scores assigned to each of the documents returned as a result of the performed search may be one factor of a set of factors used to rank the results of the search (act 440).

CONCLUSION

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while a series of acts has been described with regard to FIGS. 4A and 4B, the order of the acts may be modified in other implementations consistent with the principles of the invention. Also, non-dependent acts may be performed in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects of the invention were described without reference to the specific software code—it being understood that one of ordinary skill in the art would be able to design software and control hardware to implement the aspects based on the description herein. Further, certain portions of the invention have been described as "logic" that performs one or more functions. This logic may include hardware, such as an application specific integrated circuit or a field programmable gate array, software, or a combination of hardware and software.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, performed by one or more server devices, of determining the freshness of a first document, comprising:
identifying, by a processor of the one or more server devices, a set of second documents that each contains a link to the first document;
determining, by a processor of the one or more server devices, a freshness attribute associated with each document of the set of second documents, where the freshness attribute indicates when each document was last modified;
assigning, by a processor of the one or more server devices, a freshness score to the first document based on the freshness attribute associated with each document of the set of second documents; and
ranking, by a processor of the one or more server devices, the first document with respect to at least one other document based on the freshness score assigned to the first document.

2. The method of claim 1, where the freshness attribute comprises a HTTP "last-modified-since" attribute.

3. The method of claim 1, further comprising:
identifying times at which each of the links to the first document existed;
where assigning the freshness score to the first document is further based on the identified times.

4. The method of claim 1, further comprising:
executing a search of a corpus of documents to return results associated with the plurality of documents, where the plurality of documents include the first document.

5. The method of claim 1, assigning a freshness score to the first document further comprises:
assigning a low freshness score to the first document if a majority of documents of the set of second documents have associated freshness attributes that indicate that the corresponding documents are not fresh.

6. The method of claim 1, where assigning a freshness score to the first document further comprises:
assigning a high freshness score to the first document if a majority of documents of the set of second documents have associated freshness attributes that indicate that the corresponding documents are fresh.

7. A system comprising:
one or more server devices comprising:
a search engine to:
perform a search of a corpus of documents to return a plurality of documents, where the plurality of documents includes a first document,
identify a set of second documents that each contains, or previously contained, a link to the first document,
determine a freshness attribute associated with each document of the set of second documents, where the freshness attribute indicates when each document was last modified,
assign a freshness score to the first document based on the freshness attribute associated with each document of the set of second documents, and
rank the first document among the plurality of documents based, at least in part, on the assigned freshness score.

8. The system of claim 7, where the search engine is further to:
identify times at which each of the links to the first document existed;
where assigning the freshness score to the first document is further based on the identified times.

9. The system of claim 7, where the search engine is further to:
assign a first freshness score to the first document if a majority of documents of the set of second documents correspond to documents that have freshness values that are less than a threshold; and
assign a second freshness score to the first document if a majority of documents of the set of second documents correspond to documents that have freshness values that are greater than or equal to the threshold, where the first freshness score is less than the second freshness score.

10. A computer-readable memory device containing instructions for controlling at least one processor to perform a method of determining the freshness of a first document, the method comprising:
identifying a set of second documents that each contain, or previously contained, a link to the first document;
assigning a freshness score to the first document based on a freshness attribute associated with each document of the set of second documents, where the freshness attribute indicates when each document was last modified; and
using the assigned freshness score as a basis for ranking the first document among a plurality of other documents.

11. The computer-readable memory device of claim 10, where the method further comprises:
  identifying times at which each of the links to the first document existed;
  where assigning the freshness score to the first document is further based on the identified times.

12. The computer-readable memory device of claim 10, where the method further comprises:
  assigning a first freshness score to the first document if a majority of documents of the set of second documents correspond to documents that have freshness values that are less than a threshold; and
  assigning a second freshness score to the first document if a majority of documents of the set of second documents correspond to documents that have freshness values that are greater than or equal to the threshold, where the first freshness score is less than the second freshness score.

13. A method, performed by one or more server devices, of determining the freshness of a first document, comprising:
  determining, by a processor of the one or more server devices, whether a freshness attribute is associated with the first document;
  identifying, by a processor of the one or more server devices and based on the determination, a set of second documents that each contains, or previously contained, a link to the first document;
  assigning, by a processor of the one or more server devices, a freshness score to the first document based on a freshness attribute associated with each document of the set of second documents or the freshness attribute associated with the first document, where the freshness attribute indicates when each document was last modified; and
  using, by a processor of the one or more server devices, the assigned freshness score as a basis for ranking the first document among a plurality of documents returned as results of an executed search.

14. The method of claim 13, further comprising:
  identifying times at which each of the links to the first document existed;
  where assigning the freshness score to the first document is further based on the identified times.

15. The method of claim 13, where assigning a freshness score to the first document is further based on the freshness attribute associated with the first document.

16. The method of claim 13, where the set of second documents that each contains, or previously contained, a link to the first document are identified if a freshness attribute is not associated with the first document.

17. The method of claim 16, where the freshness attribute comprises a HTTP "last-modified-since" attribute.

18. The method of claim 13, further comprising:
  executing a search of a corpus of documents to return results comprising the plurality of documents, where the plurality of documents include the first document.

19. The method of claim 13, where assigning a freshness score to the first document further comprises:
  assigning a low freshness score to the first document if a majority of documents of the set of second documents have associated freshness attributes that indicate that the corresponding documents are not fresh.

20. The method of claim 13, where assigning a freshness score to the first document further comprises:
  assigning a high freshness score to the first document if a majority of documents of the set of second documents have associated freshness attributes that indicate that the corresponding documents are fresh.

21. A system comprising:
  one or more server devices comprising:
    a search engine to:
      perform a search of a corpus of documents to return a plurality of documents, where the plurality of documents includes a first document,
      determine whether a measure of freshness associated with the first document can be determined,
      identify, when the measure of freshness associated with the first document cannot be determined, a set of second documents that each contains a link to the first document,
      determine a measure of freshness associated with each document of the set of second documents,
      assign a freshness score to the first document based on the measure of freshness associated with each document of the set of second documents or the measure of freshness associated with the first document, where the measure of freshness indicates when each document was last modified, and
      rank the first document among the plurality of documents based, at least in part, on the assigned freshness score.

22. The system of claim 21, where the search engine is further configured to:
  identify times at which each of the links to the first document existed;
  where assigning the freshness score to the first document is further based on the identified times.

23. The system of claim 21, where the search engine is further to:
  assign a first freshness score to the first document if a majority of documents of the set of second documents correspond to documents that have freshness values that are less than a threshold; and
  assign a second freshness score to the first document if a majority of documents of the set of second documents correspond to documents that have freshness values that are greater than or equal to the threshold, where the first freshness score is less than the second freshness score.

24. A computer-readable memory device containing instructions for controlling at least one processor to perform a method of determining the freshness of a first document, the method comprising:
  determining whether a measure of freshness associated with the first document can be determined;
  identifying, if the measure of freshness associated with the first document cannot be determined, a set of second documents that each contains, or previously contained, a link to the first document;
  determining a freshness attribute associated with each document of the set of second documents, where the freshness attribute indicates when each document of the set of second documents was last modified;
  assigning a freshness score to the first document based on the freshness attribute associated with each document of the set of second documents; and
  ranking the first document with respect to at least one other document based on the freshness score assigned to the first document.

25. The computer-readable memory device of claim 24, where the method further comprises:
  assigning a first freshness score to the first document if a majority of documents of the set of second documents correspond to documents that have freshness values that are less than a threshold; and assigning a second freshness score to the first document if a majority of documents of the set of second documents correspond to documents that have freshness values that are greater than or equal to the threshold, where the first freshness score is less than the second freshness score.

26. The computer-readable memory device of claim 24, where the method further comprises:
    executing a search of a corpus of documents to return results comprising a plurality of documents, where the plurality of documents include the first document; and
    using the assigned freshness score as one basis for ranking the first document among the plurality of documents returned as the results of the executed search.

27. A method, performed by one or more server devices, of assigning a freshness score to a first document, comprising:
    identifying, by a processor of the one or more server devices, a set of second documents that each contains, or previously contained, a link to the first document;
    determining, by a processor of the one or more server devices, a measure of freshness associated with each document of the set of second documents;
    assigning, by a processor of the one or more server devices, a first freshness score to the first document if a majority of documents of the set of second documents correspond to documents that have freshness values that are less than a threshold;
    assigning, by a processor of the one or more server devices, a second freshness score to the first document if a majority of documents of the set of second documents correspond to documents that have freshness values that are greater than or equal to the threshold, where the first freshness score is different than the second freshness score; and ranking, by a processor of the one or more server devices, the first document with respect to at least one other document based on the freshness score assigned to the first document.

28. The method of claim 27, where the freshness of a document indicates when the document was last modified.

29. The method of claim 28, where the freshness is based on a HTTP "last-modified-since" attribute.

30. The method of claim 27, further comprising:
    performing a search of a corpus of documents to return results comprising the plurality of documents, where the plurality of documents include the first document.

31. The method of claim 30, further comprising:
    ranking the first document among the plurality of documents based, at least in part, on the assigned first or second freshness score.

32. A system, implemented within one or more computer devices, for determining a freshness of a first document, comprising:
    means for identifying a set of second documents that each contains, or previously contained, a link to the first document;
    means for determining a freshness attribute associated with each document of the set of second documents;
    means for determining a freshness score of the first document based on the freshness attribute associated with each document of the set of second documents, where the freshness attribute indicates when each document was last modified; and
    means for ranking the first document with respect to at least one other document based on the determined freshness score.

33. The system of claim 32, further comprising:
    means for identifying times at which each of the links to the first document existed;
    where the means for determining the freshness score of the first document is further based on the identified times.

34. The system of claim 32, further comprising:
    means for assigning a first freshness score to the first document if a majority of documents of the set of second documents correspond to documents that have freshness values that are less than a threshold; and
    means for assigning a second freshness score to the first document if a majority of documents of the set of second documents correspond to documents that have freshness values that are greater than or equal to the threshold, where the first freshness score is less than the second freshness score.

35. A method, performed by one or more server devices, of determining the freshness of a first document, comprising:
    identifying, by a processor of the one or more server devices, a set of second documents that each contains, or once contained, a link to the first document;
    determining, by a processor of the one or more server devices, times at which each of the links to the first document existed;
    assigning, by a processor of the one or more server devices, a freshness score to the first document based on the determined times; and
    ranking, by a processor of the one or more server devices, the first document with respect to at least one other document based on the freshness score assigned to the first document.

36. The method of claim 35, where assigning a freshness score to the first document further comprises:
    assigning a first freshness score to the first document if a first number of links that currently point to the first document is smaller than a second number of links that pointed to the first document at some time in the past.

37. The method of claim 35, where assigning a freshness score to the first document further comprises:
    assigning a second freshness score to the first document if a first number of links that pointed to the first document at some time in the past is smaller than a second number of links that currently point to the first document.

38. The method of claim 35, where assigning a freshness score to the first document further comprises:
    assigning a low freshness score to the first document if a ratio of a first number of recent links to the first document to a second number of old inks to the first document is larger than a specified threshold value.

39. The method of claim 35, where assigning a freshness score to the first document further comprises:
    assigning a high freshness score to the first document if a ratio of a first number of recent links to the first document to a second number of old links to the first document is smaller than a specified threshold value.

* * * * *